(12) United States Patent
Yamada

(10) Patent No.: US 10,877,663 B2
(45) Date of Patent: Dec. 29, 2020

(54) DISPLAY METHOD AND DISPLAY APPARATUS

(71) Applicant: SEIKO EPSON CORPORATION, Tokyo (JP)

(72) Inventor: Yusuke Yamada, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/663,531

(22) Filed: Oct. 25, 2019

(65) Prior Publication Data

US 2020/0133484 A1 Apr. 30, 2020

(30) Foreign Application Priority Data

Oct. 26, 2018 (JP) .................................. 2018-201569

(51) Int. Cl.
*G06F 3/0481* (2013.01)
*G06F 3/0482* (2013.01)
*G06F 3/0488* (2013.01)

(52) U.S. Cl.
CPC ........ *G06F 3/04886* (2013.01); *G06F 3/0482* (2013.01); *G06F 3/04817* (2013.01); *G06F 2203/04803* (2013.01)

(58) Field of Classification Search
CPC ....... G06F 2203/04803; G06F 3/04817; G06F 3/0482; G06F 3/04886
See application file for complete search history.

(56) References Cited

U.S. PATENT DOCUMENTS

| 2006/0268100 | A1* | 11/2006 | Karukka | H04M 1/72583 348/14.01 |
| 2009/0002335 | A1* | 1/2009 | Chaudhri | G06F 16/904 345/173 |
| 2009/0237562 | A1* | 9/2009 | Fujiwara | H04N 5/44591 348/564 |
| 2012/0045188 | A1* | 2/2012 | Sasaki | G06F 3/0482 386/230 |
| 2012/0287165 | A1 | 11/2012 | Yamada | |
| 2016/0378318 | A1* | 12/2016 | Tsuju | G06F 3/04845 715/835 |
| 2018/0198988 | A1* | 7/2018 | Suo | H04N 5/23216 |

FOREIGN PATENT DOCUMENTS

JP 2011-221586 A 11/2011
JP 2012-238223 A 12/2012

* cited by examiner

*Primary Examiner* — Hong Zhou
(74) *Attorney, Agent, or Firm* — Oliff PLC

(57) ABSTRACT

A thumbnail bundle in which a plurality of thumbnail images are juxtaposed in a first direction is displayed in a first display region of a display section, and a main image selected from the plurality of thumbnail images is displayed in a second display region disposed with respect to the first display region in a second direction that intersects the first direction. The displayed image bundle includes a static section in which the thumbnail images are juxtaposed at equal intervals with adjacent ones of the thumbnail images partially overlapping with each other and a dynamic section in which the thumbnail images are so disposed that the distance between adjacent ones of the thumbnail images is greater than the distance between the thumbnail images in the static section. When any of the thumbnail images located in the static section is selected, the selected thumbnail image is moved into the dynamic section.

9 Claims, 15 Drawing Sheets

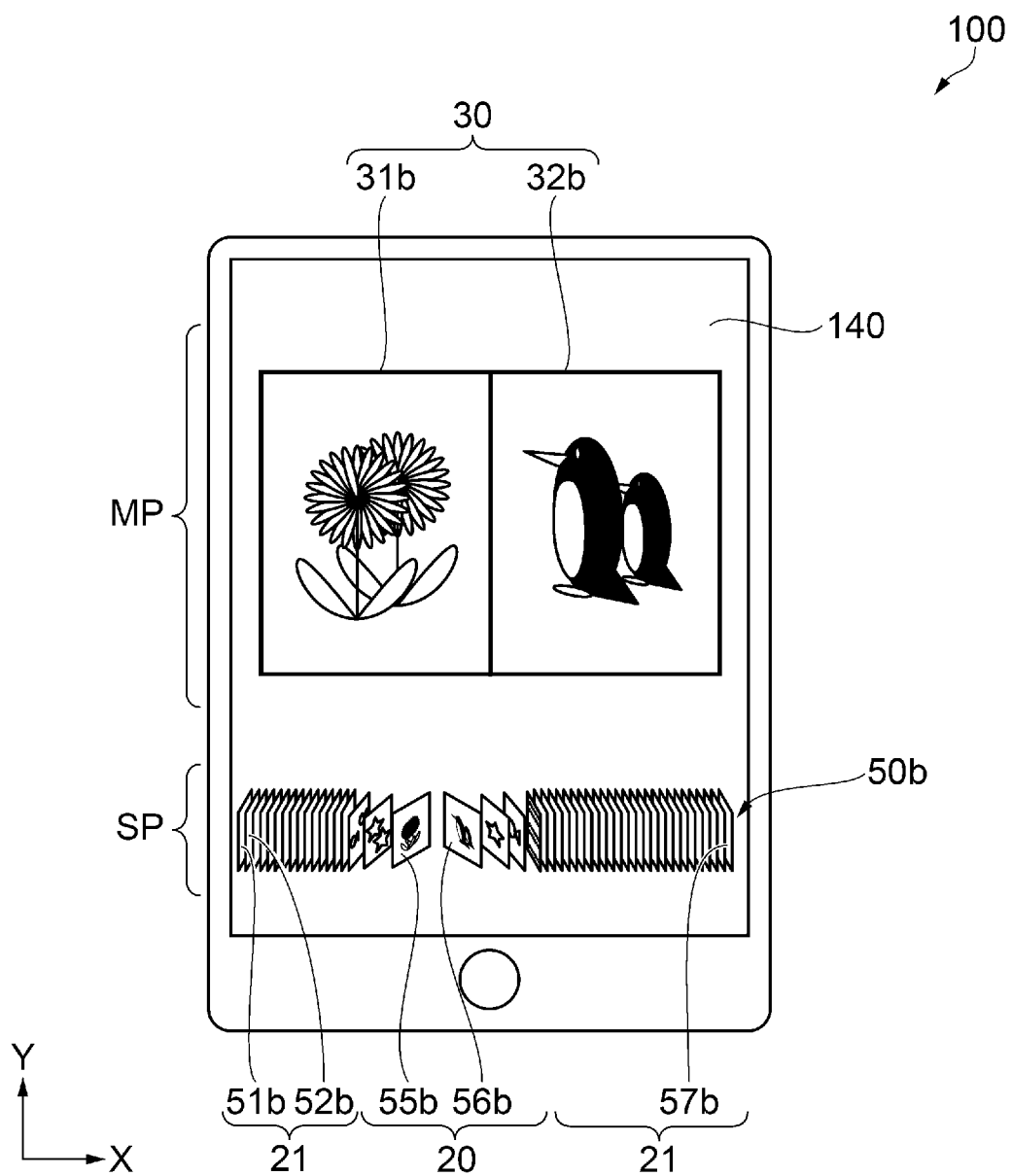

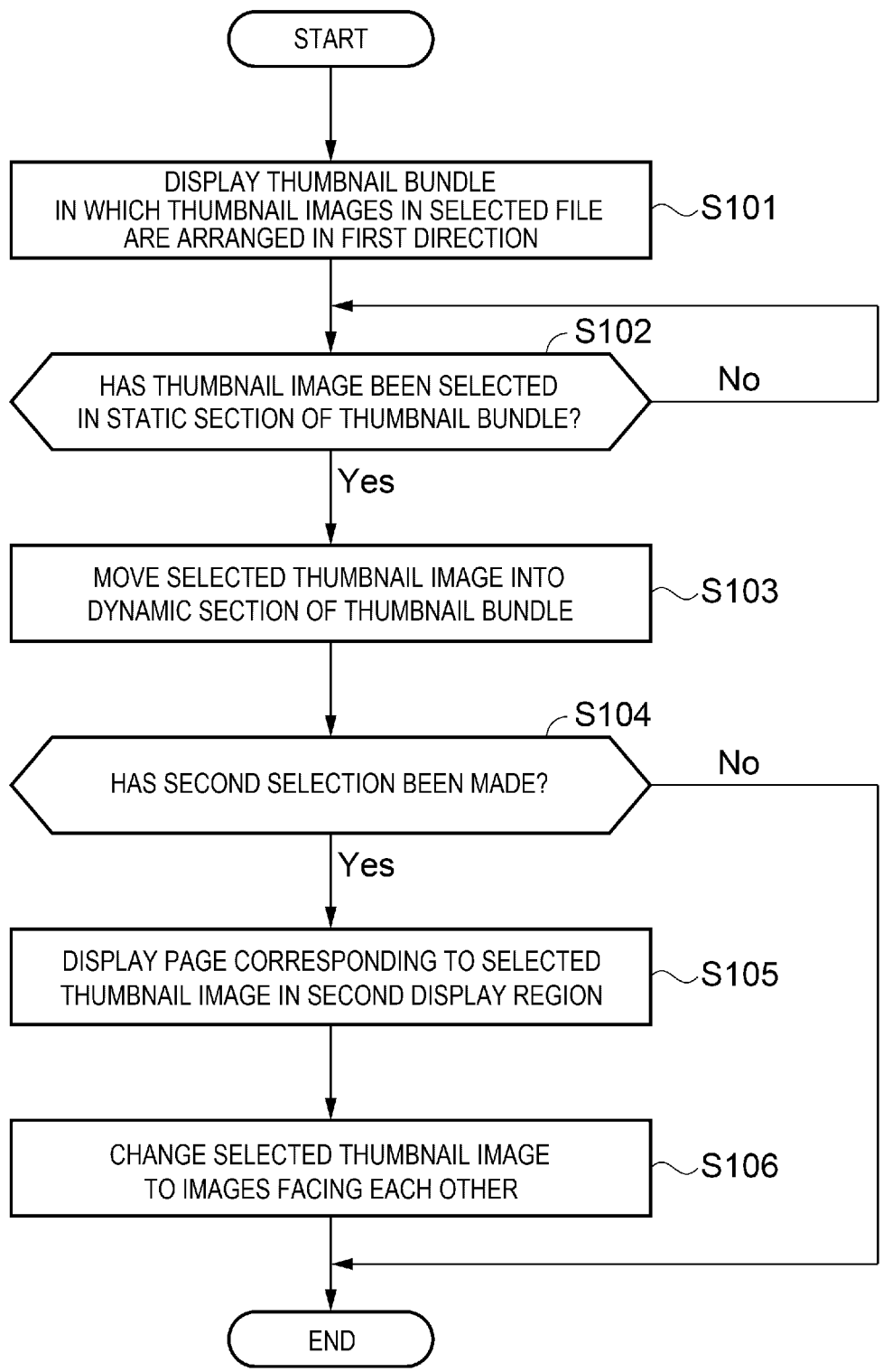

DISPLAY METHOD AND DISPLAY APPARATUS

The present application is based on, and claims priority from JP Application Serial Number 2018-201569, filed Oct. 26, 2018, the disclosure of which is hereby incorporated by reference herein in its entirety.

BACKGROUND

1. Technical Field

The present disclosure relates to a display method and a display apparatus.

2. Related Art

As a display method of related art for displaying a plurality of folders and a plurality of images stored therein, JP-A-2011-221586, for example, discloses a method for displaying an image group that is a set of a plurality of images juxtaposed at equal intervals and a page at which a user desires to particularly look in a display section with adjacent ones of the plurality of images partly overlapping with each other. In the method, the user selects a page at which the user desires to particularly look from the images contained in the image group to enlarge and display the page at which the user desires to particularly look in a display area outside the area where the image group is displayed.

In the method disclosed in JP-A-2011-221586, however, when the user selects an image at which the user desires to particularly look from the images in the image group, it is difficult to read and understand the content of each of the images because the image group is a set of a plurality of images juxtaposed at equal intervals with adjacent ones of the plurality of images partly overlapping with each other, and it is therefore difficult to perform image selection search.

SUMMARY

A display method according to an aspect of the present application is a display method for displaying a display image on a display section. The display section has a first display region and a second display region. An image bundle in which a plurality of images are juxtaposed in a first direction is displayed in the first display region, and a main image selected from the plurality of images is displayed in the second display region disposed with respect to the first display region in a second direction that intersects the first direction. The displayed image bundle includes a static section in which the images are juxtaposed at equal intervals with images adjacent to each other out of the juxtaposed images partially overlapping with each other and a dynamic section in which the images are so disposed that a distance between images adjacent to each other out of the juxtaposed images is greater than a distance between the images in the static section. When any of the images located in the static section is selected, the selected image is moved into the dynamic section.

In the display method described above, the plurality of images may be so displayed as to be disposed along a first imaginary axis, rotated around respective second imaginary axes that intersect the first imaginary axis, and further rotated around the first imaginary axis.

In the display method described above, the image moved into the dynamic section may be displayed in the form of images facing each other.

In the display method described above, the images located in the image bundle and corresponding to the main image displayed in the second display region may be displayed in a form of images facing each other.

In the display method described above, a central portion of the dynamic section may move when the image is selected, and transition of the selected image to the main image and the images facing each other may be performed by second selection after the selection of the image.

In the display method described above, the plurality of images contained in the image bundle may have a first image positionally moved in advance in the second direction, and when a second image is selected from the images located in the static section, the first image in the vicinity of the selection position may be moved to a central portion of the dynamic section that is a central portion in the first direction, and the second image may be moved into the dynamic section.

In the display method described above, the plurality of images contained in the image bundle may have a first image positionally moved in advance in the second direction, and when the first image is selected, the first image may return to an original position thereof, and the main image corresponding to the first image may be displayed in the second display region.

In the display method described above, the plurality of images contained in the image bundle may have a first image positionally moved in advance in the second direction, and when the main image is selected, the first image may return to an original position thereof.

In the display method described above, in addition to the main image displayed in the second display region, another image to be referred to may be selected from the images in the image bundle and displayed as a reference image in the second display region.

In the display method described above, an identification mark may be displayed at any of the images contained in the image bundle and corresponding to the reference image.

A display apparatus according to an aspect of the present application includes a display section that has a first display region and a second display region and displays a display image, a thumbnail image generator that generates a plurality of images disposed along a first imaginary axis, rotated around a second imaginary axis that intersects the first imaginary axis, further rotated around the first imaginary axis, and displayed on the display section, a display image generator that includes a static section in which the images are juxtaposed at equal intervals with adjacent images of the juxtaposed images partially overlapping with each other and a dynamic section in which the images are so disposed that a distance between adjacent images of the juxtaposed images is greater than a distance between the images in the static section and generates an image bundle in which the images are juxtaposed along a first direction, and a controller that displays the image bundle in the first display region, displays a main image selected from the plurality of images in the second display region disposed with respect to the first display region in a second direction that intersects the first direction, moves, when any of the images located in the static section is selected, the selected image into the dynamic section, and displays the selected image on the display section.

BRIEF DESCRIPTION OF THE DRAWINGS

FIG. 3D shows a variation of Display Example 1.

FIG. 4 is a flowchart for describing Display Method 1 for displaying images on a display section.

DESCRIPTION OF EXEMPLARY EMBODIMENTS

An embodiment of a display apparatus and a method for displaying images on the display apparatus will be described below with reference to the drawings. It is not intended that the embodiment described below unduly limits the content of the present disclosure set forth in the appended claims. Further, all configurations described in the following embodiment are not necessarily essential configuration requirements of the present disclosure.

Embodiment

1. Display Apparatus

Figure 1:
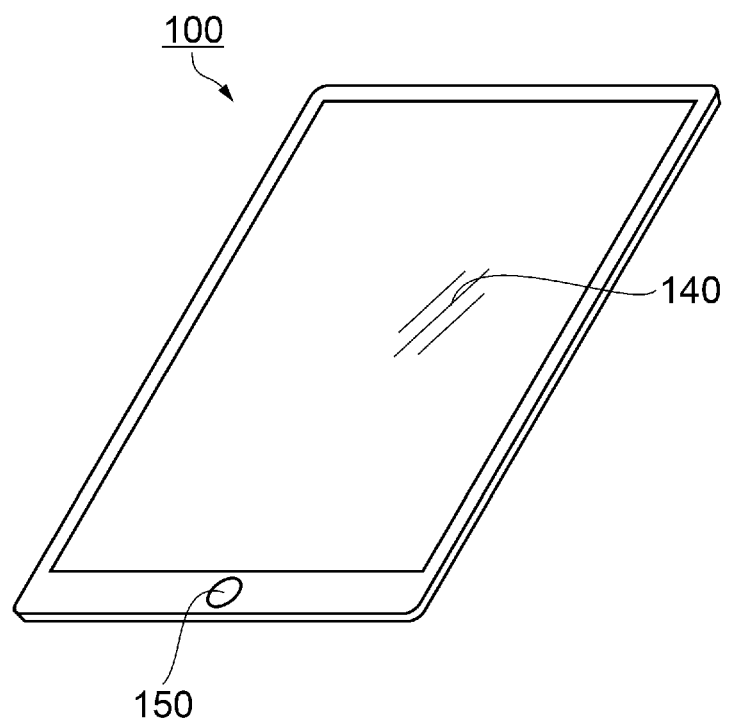
FIG. 1 is an exterior perspective view showing an overview of a smartphone as an example of a display apparatus according to an embodiment.
Figure 2:
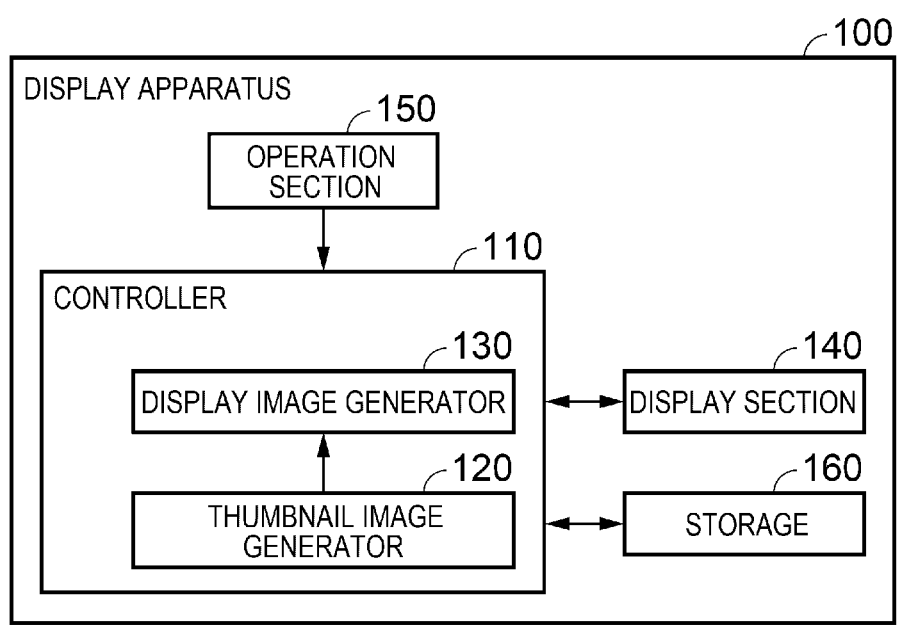
FIG. 2 is a block diagram showing a hardware configuration of the display apparatus.
Figure 3A:
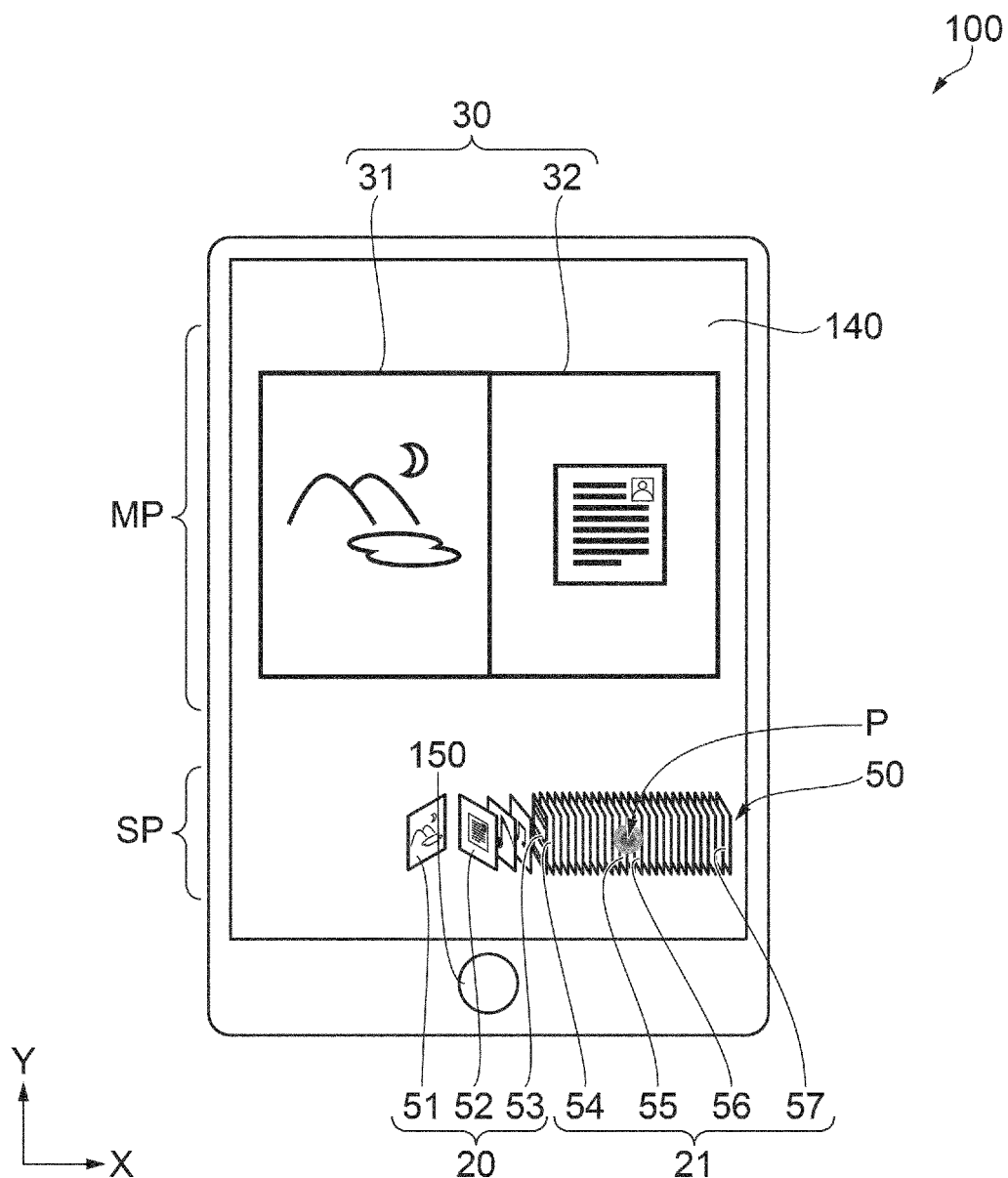
FIG. 3A shows Display Example 1, in which a main page and a thumbnail bundle containing thumbnail images are displayed, before the thumbnail images are moved.
Figure 3B:
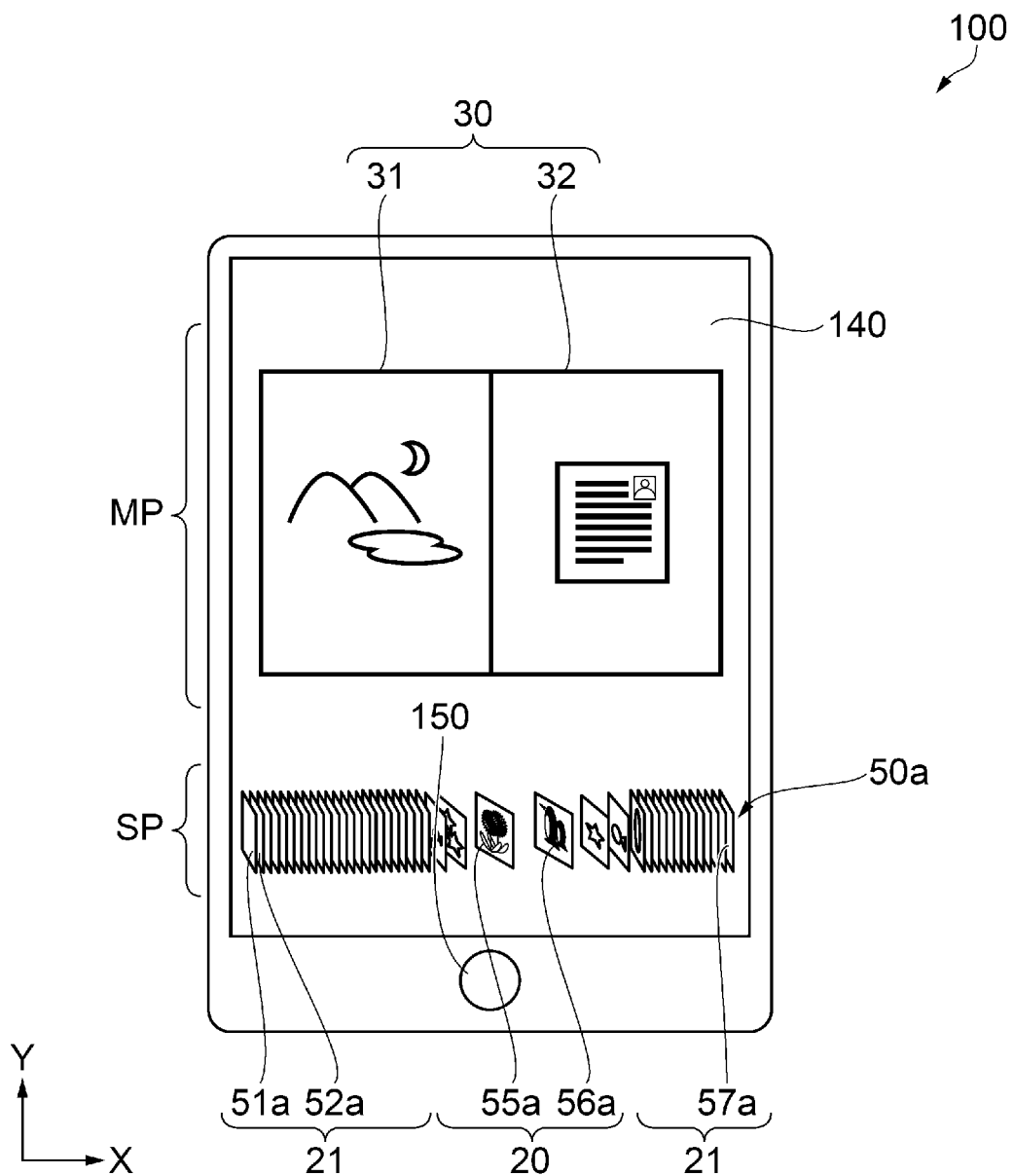
FIG. 3B shows Display Example 1, in which a main page and a thumbnail bundle containing thumbnail images are displayed, after the thumbnail images is moved.
Figure 3C:
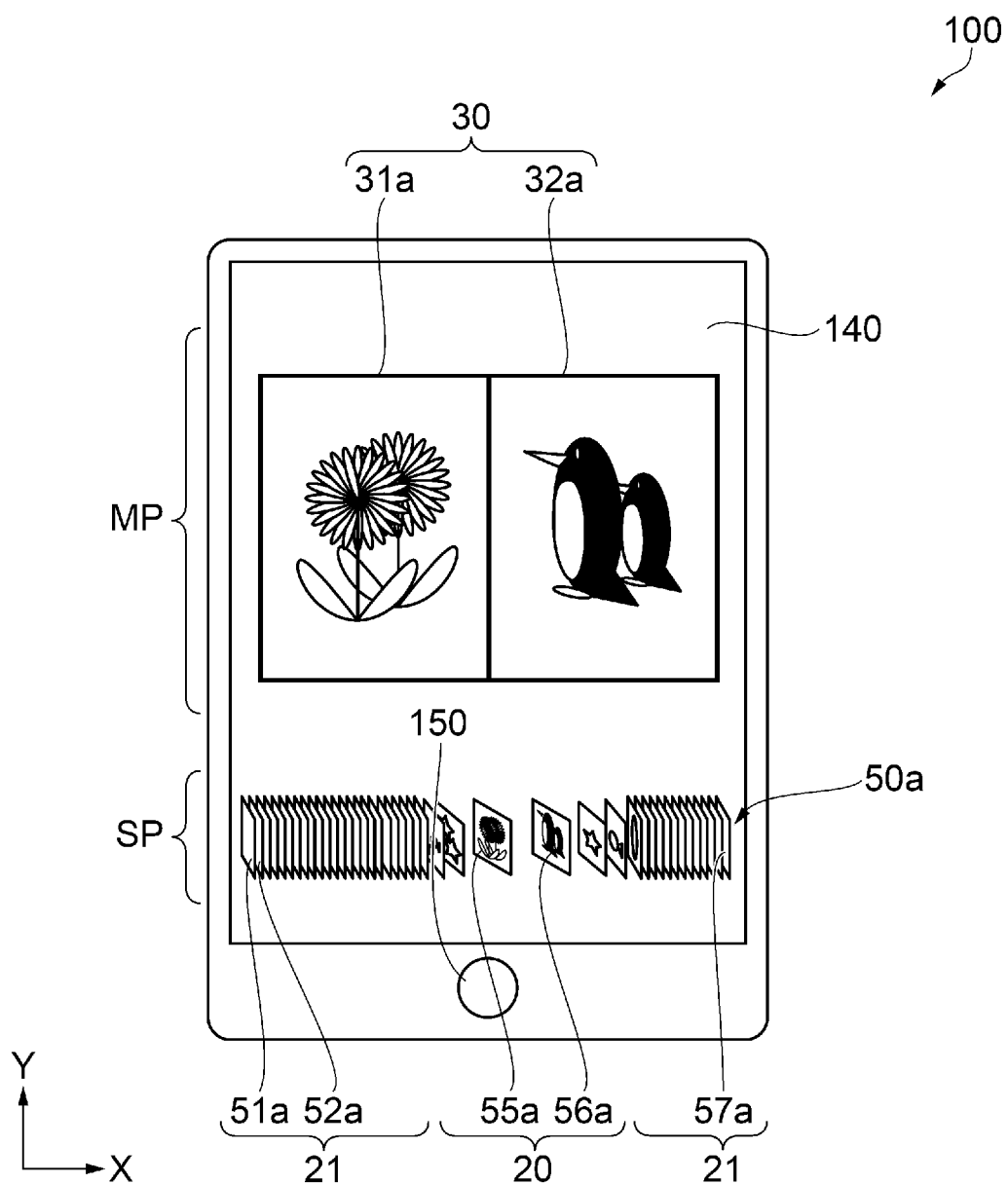
FIG. 3C shows Display Example 1, in which a main page and a thumbnail bundle containing thumbnail images are displayed, after thumbnail images are moved.

The configuration of the display apparatus according to the embodiment will first be described with reference to FIGS. 1, 2, 3A, 3B, 3C, and 3D. FIG. 1 is an exterior perspective view showing an overview of a smartphone as an example of the display apparatus according to the embodiment. FIG. 2 is a block diagram showing a hardware configuration of the display apparatus. FIG. 2 is a block diagram showing the configuration of a function of the display apparatus that is the function of displaying each page of an electronic book and electronic photographs, thumbnail images, and a thumbnail bundle. FIG. 3A shows Display Example 1, in which a main page and a thumbnail bundle containing thumbnail images are displayed, before the thumbnail images are moved. FIG. 3B shows Display Example 1, in which a main page and a thumbnail bundle containing thumbnail images are displayed, after the thumbnail images is moved. FIG. 3C shows Display Example 1, in which a main page and a thumbnail bundle containing thumbnail images are displayed, after the main page is moved. FIG. 3D shows a variation of Display Example 1.

A display apparatus 100 is an apparatus for viewing an electronic book, electronic photographs, and the like as shown in FIG. 1 and displays an image of each page of an electronic book, electronic photographs, and the like stored in a folder or a file and a search screen for searching for a screen that the user desires to display in the form of thumbnail images that are reduced images of the pages of the electronic book and the electronic photographs. That is, the display apparatus 100 is an example of an electronic instrument capable of displaying images. In the following description, as the images displayed on the display apparatus 100, thumbnail images 51, 52, 53, 54, 55, 56, 57, and so on (see FIG. 3A) and a thumbnail bundle 50 (see FIG. 3A) as an image bundle in which the thumbnail images 51, 52, 53, 54, 55, 56, 57, and so on are juxtaposed and displayed are presented by way of example. Further, in the present embodiment, a folder and a file are collectively called a "file" in the description.

In the following description, a "first direction" and a "second direction" are used. The "first direction" in the present specification corresponds to a horizontal direction (lateral direction) in the state in which a screen that forms a display section 140 faces the user with a content displayed on the display section 140 readable and understandable. The "second direction" is a direction that intersects the first direction and corresponds to a vertical direction (longitudinal direction) in the state in which the screen that forms the display section 140 faces the user with a content displayed on the display section 140 readable and understandable. In each drawing used to describe the display apparatus 100 and the display section 140, two axes perpendicular to each other are set as axes X and Y for convenience of the description. That is, the axis X coincides with the "first direction," which is the direction along the horizontal direction (lateral direction) of the display section 140, and the axis Y coincides with the "second direction," which is the direction along the vertical direction (longitudinal direction) of the display section 140. Further, the positive side of the axis Y is called "above" or an "upper side," the negative side of the axis Y is called "below" or a "lower side," the positive side of the axis X is called "right" or a "right side," and the negative side of the axis X is called "left" or a "left side."

The display apparatus 100 can be formed, for example, of a smartphone or a tablet-shaped terminal apparatus. The display apparatus 100 can be connected to another information processing apparatus (not shown), for example, via short-distance wireless communication or wired communication (not shown) exemplified, for example, by Bluetooth (registered trademark).

The display apparatus 100 according to the present embodiment is, for example, a smartphone including the display section 140, which displays an image, and an operation section 150, such as an operation button operated by the user, as shown in FIG. 1. The user can visually recognize an image displayed on the display section 140, which is formed, for example, of a liquid crystal display, of the display apparatus 100.

The display apparatus 100 includes as a hardware configuration a controller 110, which includes a thumbnail image generator 120 and a display image generator 130, the display section 140, the operation section 150, and a storage 160, as shown in FIG. 2.

The controller 110 includes the thumbnail image generator 120 and the display image generator 130. The controller 110 is a microcomputer including a CPU (central processing unit), a ROM (read only memory), a RAM (random access memory), and other components and controls each portion of the display apparatus 100 in accordance with a program memorized in the ROM. The controller 110 identifies the content of operation based on a signal sent from the operation section 150 and, based on the identified content, carries out the process of turning a page of an electronic book forward, the process of turning the page backward, and the process of causing the display section 140 to display a display image, such as thumbnail images and a thumbnail bundle.

Specifically, the controller 110 can access the storage 160 and write and read a variety of data, such as an electronic book and electronic photographs, to and from the storage 160. The controller 110 can further cause the thumbnail image generator 120 and the display image generator 130 to generate a variety of data relating to the pages of an electronic book, electronic photographs, and the like or thumbnail images and images in a thumbnail bundle that are reduced images of the variety of data on the electronic book, electronic photographs, and the like and generate display image data on the generated images.

As shown in FIG. 3A, the controller 110 displays an image of the thumbnail bundle 50 as the image bundle generated by the display image generator 130 in a first display region SP, which is located in a portion of the display section 140 that is a lower portion in the second direction (axis Y in FIG. 3A). The thumbnail bundle 50 is an image bundle containing a plurality of thumbnail images 51, 52, 53, 54, 55, 56, 57, and so on as the images described above juxtaposed and displayed in the first direction. In the present embodiment, the thumbnail images 51, 52, 53, 54, 55, 56, and 57, which form the thumbnail bundle 50, are shown in the thumbnail bundle 50 and represent a plurality of thumbnail images corresponding to a plurality of pages contained in one file.

The controller 110 displays a selected page selected from the plurality of thumbnail images 51, 52, 53, 54, 55, 56, 57, and so on contained in the thumbnail bundle 50 or a main image 30 selected, for example, as a representative page of the file in a second display region MP of the display section 140, which is located above the first display region SP, where the thumbnail bundle 50 is displayed. That is, the controller 110 displays the thumbnail bundle 50 in the first display region SP and the main image 30 in the second display region MP on the display section 140 with the thumbnail bundle 50 and the main image 30 juxtaposed along the second direction. The thumbnail bundle 50 and the main image 30 may be so displayed as to overlap with each other on the display section 40. In other words, the first display region SP and the second display region MP may overlap with each other. The main image 30 in Display Example 1 in the present embodiment shows two pages, a first main image 31 and a second main image 32 selected from the plurality of thumbnail images 51, 52, 53, 54, 55, 56, 57, and so on, with the two images enlarged. It is, however, noted that the number of pages displayed as the main image 30 is not limited to two and may be any number.

The controller 110 configures the thumbnail bundle 50, which is formed of the plurality of thumbnail images 51, 52, 53, 54, 55, 56, 57, and so on juxtaposed in the first direction and displayed on the display section 140, in such a way that the thumbnail bundle 50 includes a static section 21 and a dynamic section 20. The static section 21 is a constituent portion in which the thumbnail images 54, 55, 56, and 57 are juxtaposed at equal intervals with adjacent images, for example, the thumbnail images 55 and 56, partially overlapping with each other. The dynamic section 20 is a constituent section in which the thumbnail images are so disposed that the distance between adjacent images, for example, the distance between the thumbnail images 51 and 52 is greater than the distance between images in the static section 21, for example, the distance between the thumbnail images 55 and 56. The controller 110 can change the distance between adjacent images and change the orientation of an image in the dynamic section 20.

When the user touches, for example, a touch point P in the static section 21 to select the thumbnail image 55, as shown in FIG. 3A, the controller 110 moves a selected thumbnail image 55a and a thumbnail image 56a and other images in the vicinity of the thumbnail image 55a into the dynamic section 20 and disposes the moved images with the distance between adjacent images, for example, the distance between the thumbnail images 55a and 56a enlarged, as shown in FIG. 3B. In other words, when the user touches the touch point P to select the thumbnail image 55, the controller 110 moves a central portion of the dynamic section 20 to the portion in which the selected thumbnail image 55a and the thumbnail image 56a in the vicinity of the thumbnail image 55a are displayed. The action of touching the touch point P may instead be performed by a drag-and-drop action, a flicking action, or any other action. Thereafter, when the user, for example, further touches the touch point P for second selection, the controller 110 displays a first main image 31a and a second main image 32a, which correspond to the selected thumbnail image 55a and the thumbnail image 56a adjacent thereto, in the second display region MP of the display section 140 with the first main image 31a and the second main image 32a enlarged, as shown in FIG. 3C. As described above, the currently displayed first and second main images are updated to the first main image 31a and the second main image 32a in response to the second selection, which is made after the thumbnail image 55 is selected, whereby the switching of the image state can be performed without causing the user to feel uneasiness.

When the user, for example, touches the touch point P for second selection, the controller 110 can move the selected thumbnail image 55 (see FIG. 3A) into the dynamic section 20 and display thumbnail images 55b and 56b, which are images adjacent to each other, in the form of images facing each other. As described above, the currently displayed thumbnail images 55a and 56a are updated to the thumbnail images 55b and 56b displayed in the form of images facing each other in response to the second selection, which is made after the thumbnail image 55 is selected, whereby the switching of the image state can be performed without causing the user to feel uneasiness. The controller 110 then displays a first main image 31b and a second main image 32b, which correspond to the selected thumbnail image 55b and the thumbnail image 56b adjacent thereto, in the second display region MP of the display section 140. As described above, the displayed two thumbnail images 55b and 56b in the form of images facing each other allow the displayed content of an image at which the user desires to particularly look to be more readable and understandable.

The thumbnail image generator 120 reads a variety of types of data from the storage 160 and generates thumbnail images that are reduced images of the variety of types of data, such as an electronic book and electronic photographs. The thumbnail image generator 120 further generates the main image 30 containing, for example, the first main image 31 and the second main image 32, which are images of the pages selected and opened by the user and shown in FIG. 3A or images of representative pages.

Specifically, the thumbnail image generator 120 generates the thumbnail images 51, 52, 53, 54, 55, 56, 57, and so on shown in FIG. 3A as a plurality of images disposed along a first imaginary axis extending in the first direction, which is the horizontal direction of the screen that forms the display section 140, rotated around respective second imaginary axes that intersect the first imaginary axis and extend along the second direction, which is the vertical direction of the screen of the display section 140, and further rotated around the first imaginary axis. A method for generating the thumbnail images 51, 52, 53, 54, 55, 56, 57, and so on will be described later in detail with reference to FIGS. 5A to 5E.

The display image generator 130 generates an image of the thumbnail bundle 50, in which the thumbnail images 51, 52, 53, 54, 55, 56, 57, and so on representing a plurality of pages and generated by the thumbnail image generator 120 are juxtaposed along the first direction (axis X), which is the horizontal direction of the display section 140, as shown in FIG. 3A. That is, the display image generator 130 configures one thumbnail bundle, for example, the thumbnail bundle 50 containing the thumbnail images 51, 52, 53, 54, 55, 56, 57, and so on of the pages contained in one file and so displayed as to be viewed by the user in a bird's eye view.

The display image generator 130 configures the thumbnail bundle 50 in such a way that the thumbnail bundle 50 includes the static section 21 and the dynamic section 20. The static section 21 is a region having the configuration in which adjacent thumbnail images are juxtaposed at equal intervals with adjacent thumbnail images partially overlapping with each other. The dynamic section 20 has the configuration in which the thumbnail images are so disposed that the distance between adjacent thumbnail images is greater than the distance between thumbnail images in the static section 21 and allows the distance between adjacent thumbnail images to be changed. That is, the dynamic section 20 is a region where a thumbnail image can be moved and the orientation of a thumbnail image can be changed. Since the thumbnail bundle 50 includes the static section 21, in which adjacent thumbnail images are juxtaposed at equal intervals with adjacent thumbnail images partially overlapping with each other, as described above. A large number of thumbnail images, for example, the thumbnail images 51, 52, 53, 54, 55, 56, 57, and so on, can be contained in one thumbnail bundle 50. The number of thumbnail bundles 50 disposed in the display section 140 is not limited to one and may be plural.

The display section 140 displays the thumbnail bundle 50 containing the plurality of thumbnail images 51, 52, 53, 54, 55, 56, 57, and so on and a selected page selected from the plurality of thumbnail images 51, 52, 53, 54, 55, 56, 57, and so on contained in the thumbnail bundle 50 or the main image 30 selected as a representative page of the file with the main image 30 enlarged or any other image as the display image based on an instruction from the controller 110. The display section 140 can be formed, for example of a touch panel that is the combination of a liquid crystal display and a position input apparatus, such as a touch pad.

The operation section 150 is formed, for example, of an operation button or a touch panel operated by the user. The operation section 150 can send the controller 110 an operation signal produced by pressing the operation button, performing a drag-and-drop action or a flicking action on the touch panel, or any other operation.

The storage 160 is a memory that memorizes book data, electronic photograph data, and other types of data as image data to be displayed on the display section 140. The storage 160 can memorize as the file, for example, a file that stores a plurality of pages relating to data on a plurality of book as one unit and a file that stores data on a plurality of electronic photographs as one unit.

The display apparatus 100 according to the present embodiment performs the display action by using the thumbnail images 51, 52, 53, 54, 55, 56, 57, and so on as a plurality of images that are page images in a bird's eye view in an imaginary space disposed along the first imaginary axis extending in the first direction (axis X), which is the horizontal direction of the screen that forms the display section 140, rotated around the second imaginary axis that intersects the first imaginary axis and extends along the second direction (axis Y), and further rotated around the first imaginary axis. The display apparatus 100 displays the thumbnail bundle 50 as the image bundle, in which in the thumbnail images 51, 52, 53, 54, 55, 56, 57, and so on are juxtaposed in the first direction, in the first display region SP. The display apparatus 100 further displays a selected page selected from the plurality of thumbnail images 51, 52, 53, 54, 55, 56, 57, and so on contained in the thumbnail bundle 50 or the main image 30 corresponding, for example, to a page selected as a representative page of the file in the second display region MP of the display section 140, which is located above the first display region SP, where the thumbnail bundle 50 is displayed. In a case where the user desires to select and particularly look at a thumbnail image located in the static section 21 in the thumbnail bundle 50 displayed on the display section 140, and when the user selects, for example, the thumbnail image 55 by touching the touch point P, which corresponds to a position on the static section 21 that is the position of the thumbnail image that the user desires to select, the thumbnail image 55 is moved into the dynamic section 20, in which images are so disposed that the inter-image distance is greater than the inter-image distance in the static section 21. The movement increases the range over which the selected thumbnail image 55a, the thumbnail image 56a in the vicinity thereof, and other images are visually recognized, whereby the user can readily read and understand the thumbnail image 55a, the thumbnail image 56a in the vicinity thereof, and other images and can therefore readily perform selection search.

Since the display apparatus 100 displays the main image 30 containing the first main image 31a and the second main image 32a, which show a page selected from a plurality of thumbnail images 51a, 52a, 53a, 54a, 55a, 56a, 57a, and so on with the page enlarged, in the second display region MP of the display section 140, the user readily recognizes the content of the file that forms a thumbnail bundle 50a.

The controller 110 may display the thumbnail images corresponding to the main image 30 displayed in the second display region MP in the form of images facing each other. The thumbnail images corresponding to the main image 30 is one of the images arranged in the thumbnail bundle 50 displayed in the first display region SP. In other words, in the vicinity of the thumbnail images displayed in the form of images facing each other, there are other thumbnail images so displayed as to be separate from each other by an increased distance. The display operation described above allows the other thumbnail images located in the vicinity of the thumbnail images corresponding to the main image 30 in the thumbnail bundle 50 to be readily viewed, whereby the display apparatus 100 allows the user to readily read and understand the contents of the other thumbnail images.

2. Display Method

2.1. Display Method 1

A Display Method 1 to which Display Example 1 is applied in the display apparatus 100 will next be described with reference to FIG. 4. FIG. 4 is a flowchart for describing Display Method 1 for displaying thumbnail images and shows the procedure of processes carried out by the display apparatus 100. Display Example 1 will be described with reference to FIGS. 3A and 3B described above. The description will be made with the constituent portions of the display apparatus 100 labeled with the same reference characters described above.

The controller 110 first displays the thumbnail bundle 50, in which the thumbnail images 51, 52, 53, 54, 55, 56, 57, and so on in a selected file are arranged in the first direction, on the display section 140 (step S101). In this process, the controller 110 displays the thumbnail bundle 50 including the static section 21, in which the thumbnail images 54, 55, 56, and 57 are juxtaposed at equal intervals, for example, with the thumbnail images 55 and 56 partially overlapping with each other, and the dynamic section 20, in which the thumbnail images are so disposed that the distance between adjacent images, for example, the distance between the thumbnail images 51 and 52 is greater than the distance between images in the static section 21, for example, the distance between the thumbnail images 55 and 56.

The thumbnail images 51, 52, 53, 54, 55, 56, 57, and so on as images are, for example, so displayed as to be disposed along the first imaginary axis along the first direction of the screen that forms the display section 140, rotated around the respective second imaginary axes that intersect the first imaginary axis and extend along the second direction of the screen that forms the display section 140, and further rotated around the first imaginary axis. Rotating the thumbnail images 51, 52, 53, 54, 55, 56, 57, and so on around the first and second imaginary axes allows the thumbnail bundle 50 formed of the plurality of thumbnail images 51, 52, 53, 54, 55, 56, 57, and so on to be so deformed as to be viewed in a bird's eye view when the screen is so caused to face the user that the user can read and understand a displayed content. That is, the thumbnail images 51, 52, 53, 54, 55, 56, 57, and so on of pages are so deformed as to be viewed in the same manner in which the plurality of thumbnail images 51, 52, 53, 54, 55, 56, 57, and so on contained in the thumbnail bundle 50 are viewed obliquely upward in a bird's eye view.

The process of deforming a thumbnail image will now be described with reference to FIGS. 5A, 5B, 5C, 5D, and 5E. FIGS. 5A to 5E describe the process of deforming a thumbnail image. In the following description of the process of deforming a thumbnail image, the reference characters of the thumbnail images (51, 52, 53, 54, 55, 56, and 57) attached thereto in the above description are omitted.

Figure 5A:
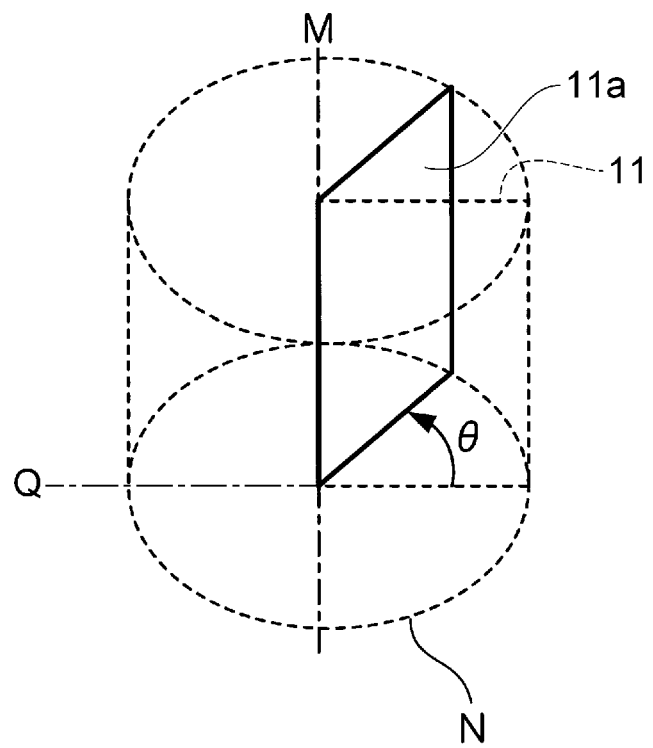
FIG. 5A describes the process of deforming a thumbnail image.
Figure 5B:
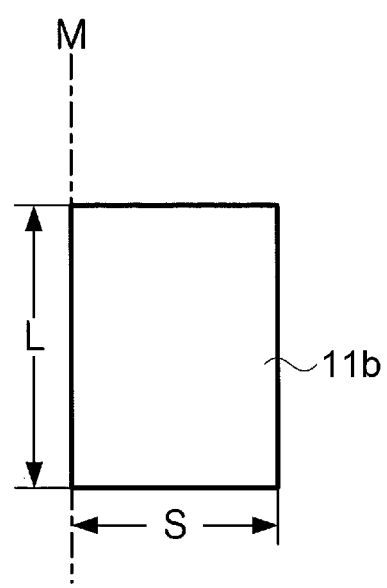
FIG. 5B describes the process of deforming a thumbnail image.

Each thumbnail image supplied from the thumbnail image generator 120 is an image of a page of a book, electronic photographs, and the like viewed in a plan view and is specifically an image 11b having a longitudinal length L and a lateral length S, as shown in FIG. 5B. In other words, the image 11b has longitudinal sides parallel to the longitudinal direction along the second direction of the display section 140 and lateral sides parallel to the lateral direction along the first direction of the display section 140.

The thumbnail image generator 120 generates an image that is a deformed thumbnail image representing a page of a book, electronic photographs, and the like. Specifically, the thumbnail image generator 120 disposes a page 11a that stands upward on a first imaginary axis Q, which is set in an imaginary horizonal plane N in an imaginary space, and rotates the page 11a by an angle of rotation θ from a reference position 11, where the lateral direction of the page 11a is parallel to the lateral direction of the display section 140, around a secondary imaginary axis M, which intersects the first imaginary axis Q, as shown in FIG. 5A. The thumbnail image generator 120 further generates an image that is the page 11a rotated around the second imaginary axis M in the imaginary space and further rotated by an angle of depression φ (no shown) around the first imaginary axis Q in the imaginary space. That is, the thumbnail image generator 120 generates an image that is the page 11a viewed obliquely downward at the angle of depression φ (not shown) from a viewpoint above the upper side of the page 11a rotated around the second imaginary axis M in the imaginary space. In other words, the image that is a deformed thumbnail image is generated as an image that is the page 11a obliquely viewed at the angle of depression φ (not shown) from a viewpoint above the upper side of the page 11a in a bird's eye view in the imaginary space. In a case where the page is not rotated, the lateral direction of the page is parallel to the lateral direction of the display section 140 (first direction), and the angle of rotation θ is 0°. The angle of depression φ is an angle specified in advance. The second imaginary axis M is not necessarily parallel to the longitudinal sides (sides in second direction) of the page and may intersect the lateral sides of the page.

Figure 5C:
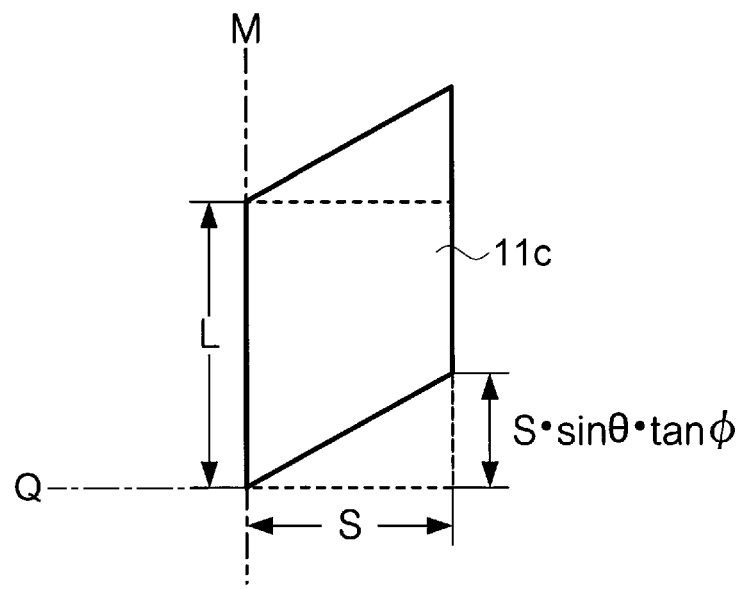
FIG. 5C describes the process of deforming a thumbnail image.
Figure 5D:
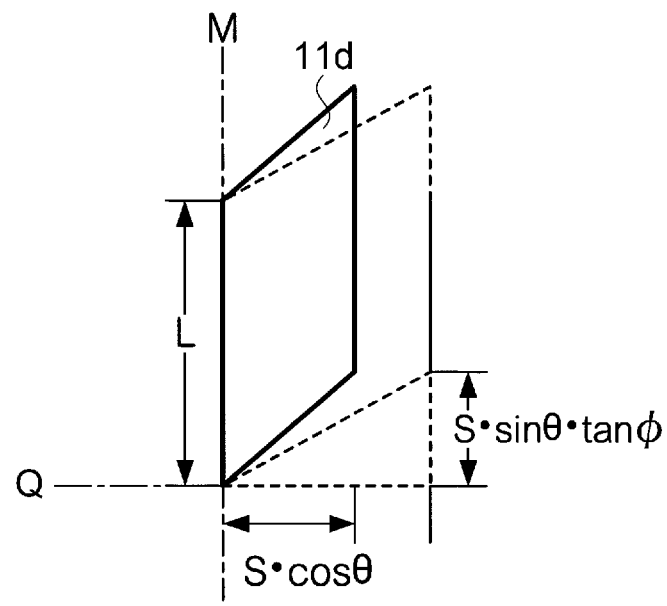
FIG. 5D describes the process of deforming a thumbnail image.
Figure 5E:
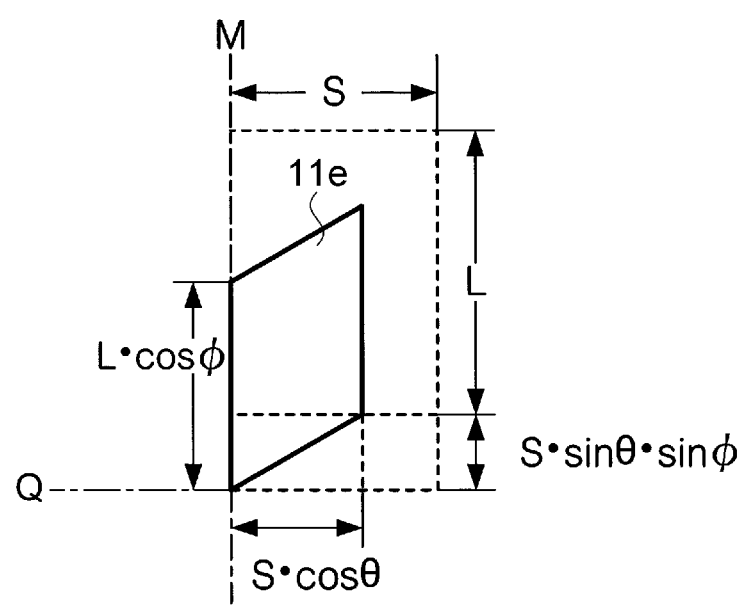
FIG. 5E describes the process of deforming a thumbnail image.

Specifically, the thumbnail image generator 120 first longitudinally deforms the image 11b (see FIG. 5B), which is a page viewed from the front side thereof, with no change in the lateral width of the image 11b and shifts the right side of the image 11b shown in FIG. 5B relative to the left side thereof by S·sin θ·tan φ to generate an image 11c, as shown in FIG. 5C. The thumbnail image generator 120 then reduces the image 11c shown in FIG. 5C in the lateral direction by a factor of cos θ to generate an image 11d, as shown in FIG. 5D. As a result, the lateral width of the image 11d is S·cos θ. The thumbnail image generator 120 reduces the image 11d shown in FIG. 5D in the longitudinal direction by a factor of cos φ to finally generate an image 11e, as shown in FIG. 5E. As a result, the longitudinal dimension of the image 11e is L·cos φ. The thus produced image 11e is the page rotated by the angle of rotation θ around the second imaginary axis M and further rotated around the first imaginary axis Q. In other words, the thus produced image 11e is the page rotated by the angle of rotation θ around the second imaginary axis M and viewed downward at the angle of depression φ from a viewpoint above the upper side of the page.

The angle of rotation θ is set at an angle of rotation specified in advance in the case of a selected page identified by selected page data and is set at an angle of rotation −θ1 specified in advance in the case of the page immediately before the selected page. In the case of a page other than the selected page, the angle of rotation θ is gradually increased as the page number differs from that of the selected page by a greater value; the angle of rotation θ of a page after the selected page is so set as to fall within θ1<θ<90° in the present embodiment, and the angle of rotation θ of a page before the selected page is so set as to fall within −θ1−<θ<−90° in the present embodiment.

Referring back to FIG. 4, the controller 110 then evaluates whether or not there is a thumbnail image selected, for example, by the user's touching of the touch point P (see FIG. 3A) on the touch panel (not shown) of the display section 140 (step S102). In a case where there is a thumbnail image selected, for example, by the touch point P (Yes in step S102), the controller 110 moves the selected thumbnail image, for example, the thumbnail images 55 and 56 into the dynamic section (step S103). The controller 110 then performs display operation with an increased distance between the moved thumbnail images 55a and 56a in the thumbnail bundle 50a so that the thumbnail images 55a and 56a overlap with each other by a small amount or do not overlap with each other at all, as shown in FIG. 3B.

In a case where there is no thumbnail image selected, for example, by the touch point P (No in step S102), the controller 110 keeps the display state in step S101 until an image is selected, for example, by the touch point P. The action of touching the touch point P described above is instead performed by a drag-and-drop action, a flicking action, or any other action.

The controller 110 then evaluates whether or not the user has made second selection, for example, whether or not the user has further touched the touch point P (step S104). In a case where the user has made second selection, for example, the user has further touched the touch point P (Yes in step S104), the controller 110 displays the main image 30 containing the first main image 31a and the second main image 32a, which are displayed images of enlarged pages corresponding to the thumbnail images 55a and 56a moved into the dynamic section 20, in the second display region MP of the display section 140 (step S105), as shown in FIG. 3C. As described above, the currently displayed main image is updated to the main image 30 containing the first main image 31a and the second main image 32a in response to the second selection, which is made after a thumbnail image is selected, whereby the switching of the image state can be performed without causing the user to feel uneasiness. In a case where the user has made no second selection, for example, the user has not further touched the touch point P (No in step S104), the controller 110 terminates the series of processes.

Thereafter, the controller 110 can change the orientation of the moved thumbnail images 55 and 56 displayed on the display section 140 at the second selection timing in such a way that the thumbnail images 55 and 56 are displayed as the thumbnail images 55b and 56b in the form of images facing each other, as shown in FIG. 3D (step S106). A thumbnail bundle 50b formed of the thumbnail images 55b and 56b in the form of images facing each other and the thumbnail images 51b, 52b, 57b, and so on allows the displayed content of the selected thumbnail images 55 and 56 at which the user desires to particularly look to be more readable and understandable.

The timing at which the thumbnail images 55 and 56 are moved, the timing at which the distance between the moved thumbnail images 55a and 56a is increased, or the timing at which the moved thumbnail images 55a and 56a are displayed in the form of images facing each other can be the timing at which the main image 30 is moved. In other words, the actions described above may be performed in accordance with the switching timing at which the main image 30 is updated and displayed. Moving the thumbnail images 55 and 56, increasing the distance between the moved thumbnail images 55a and 56a, or displaying the moved thumbnail images 55a and 56a in the form of images facing each other at the timing described above reliably allows update of the aspect in which the thumbnail images 55 and 56 are displayed.

The series of processes in Display Method 1 for displaying Display Example 1 on the display section 140 ends after the processes are carried out in accordance with the procedure described above. In the Display Method 1, when the user desires to particularly look, for example, at the thumbnail image 55 out of the thumbnail images located in the static section 21 in the thumbnail bundle 50 displayed on the display section 140, and when the user selects, drags-and-drops, or flicks the thumbnail image 55, the controller 110 displays the thumbnail bundle 50a, in which the selected thumbnail image 55 is moved into the dynamic section 20, in which images are so disposed that the distance between the images is greater than that in the static section 21. The movement increases the range over which the selected thumbnail image 55, the thumbnail image 56 in the vicinity thereof, and other images are visually recognized, whereby the user can readily read and understand the thumbnail images 55 and 56 and other images and can therefore perform selection search.

Further, in Display Method 1, the main image 30 selected from the plurality of thumbnail images 51, 52, 53, 54, 55, 56, 57, and so on is displayed in the second display region MP of the display section 140, whereby the user can readily recognize the content of the thumbnail bundle 50.

2.2. Display Method 2

Figure 6A:
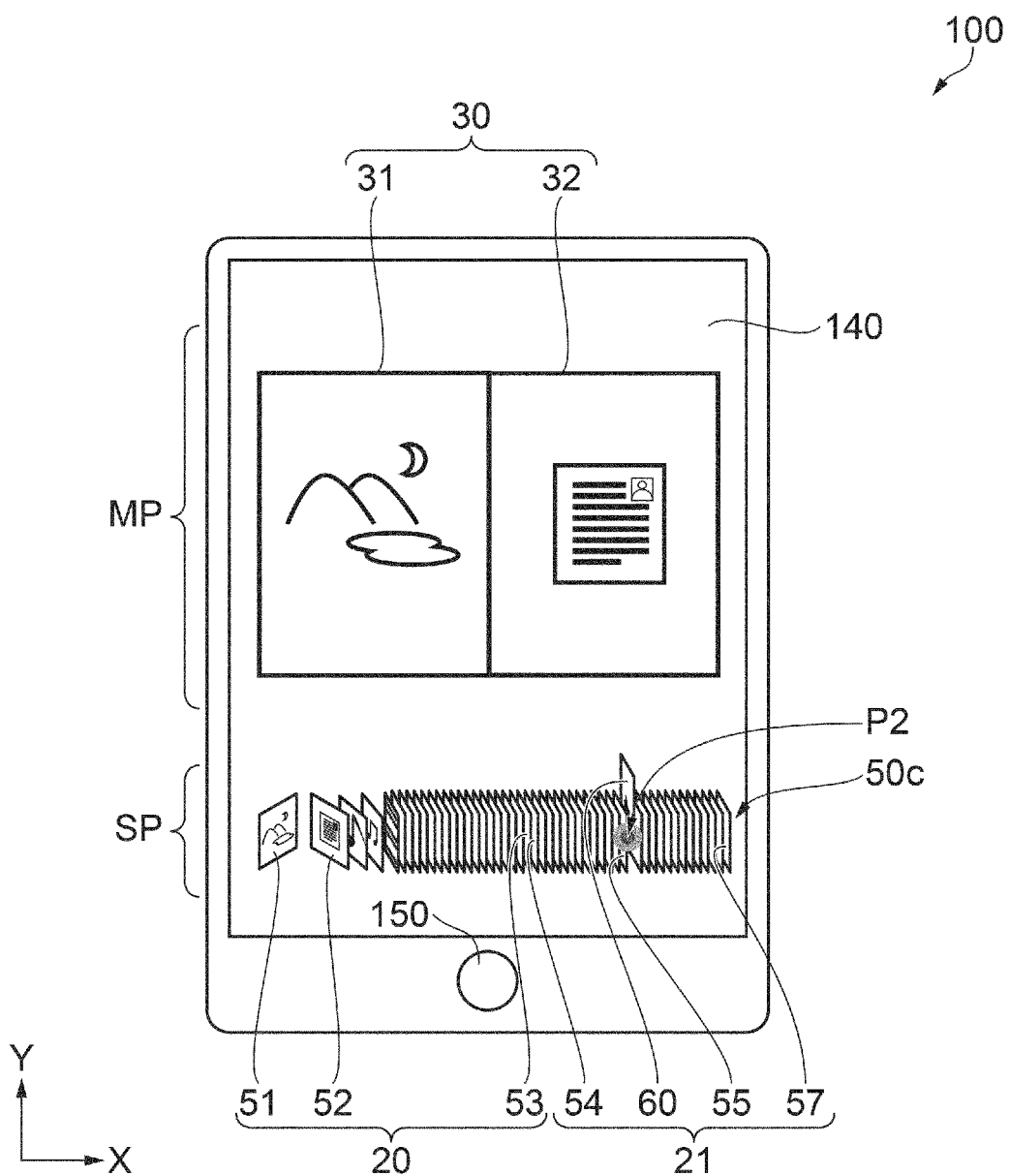
FIG. 6A shows Display Example 2, in which a main page and a thumbnail bundle containing thumbnail images are displayed, before the thumbnail images are moved.
Figure 6B:
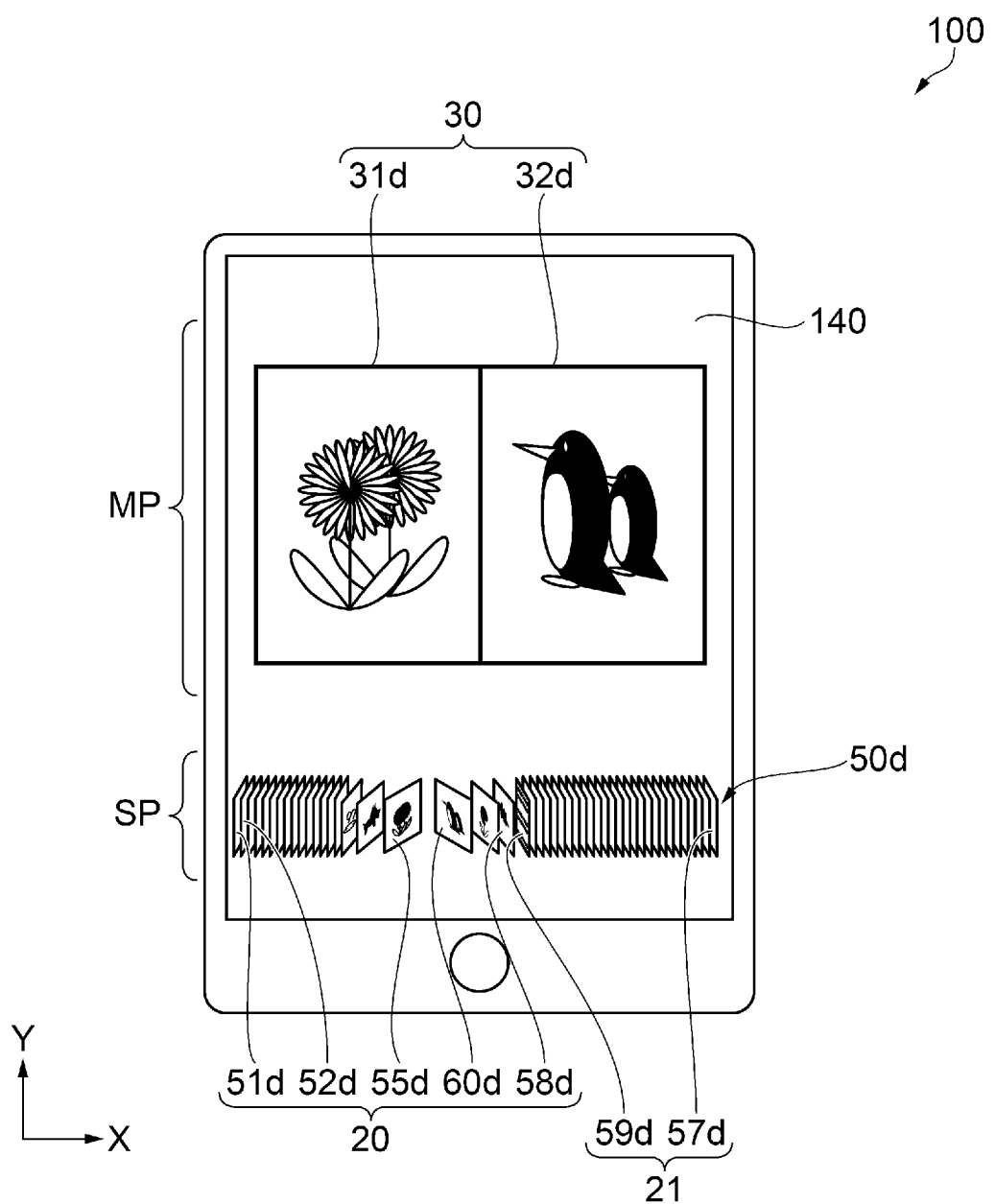
FIG. 6B shows Display Example 2, in which a main page and a thumbnail bundle containing thumbnail images are displayed, after the thumbnail images are moved.
Figure 7:
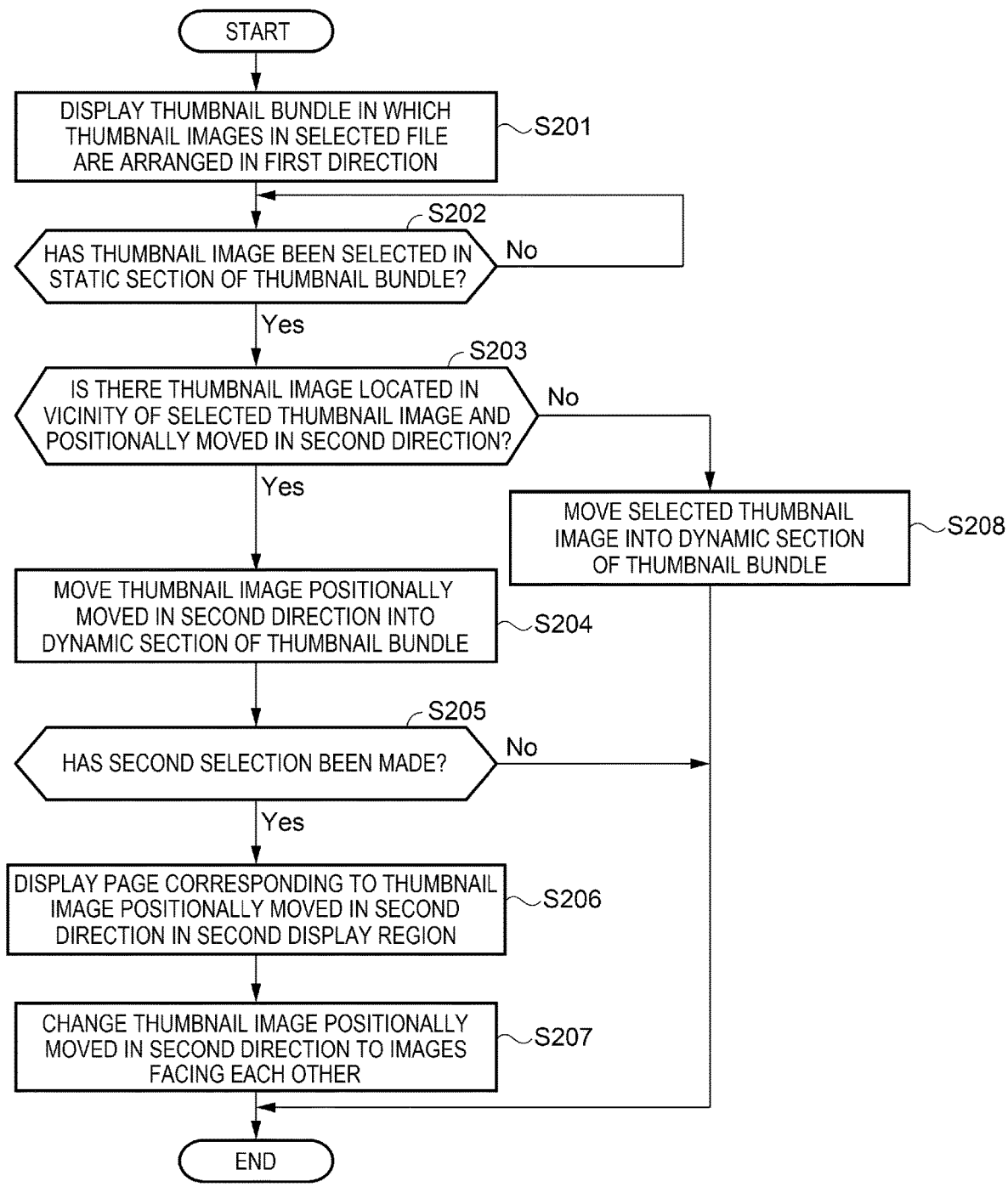
FIG. 7 is a flowchart for describing Display Method 2 for displaying images on the display section.

Display Method 2 to which Display Example 2 is applied in the display apparatus 100 will next be described with reference to FIGS. 6A and 6B and FIG. 7. FIG. 6A shows Display Example 2, in which a main page and a thumbnail bundle containing thumbnail images are displayed, before the thumbnail images are moved. FIG. 6B shows Display Example 2, in which a main page and a thumbnail bundle containing thumbnail images are displayed, after the thumbnail images are moved. FIG. 7 is a flowchart for describing Display Method 2 for displaying images on the display section. The description of Display Method 2 and Display Example 2 will also be made with the constituent portions of the display apparatus 100 labeled with the same reference characters described above.

The controller 110 first displays a thumbnail bundle 50c, in which thumbnail images 51, 52, 53, 54, 55, 57, 60, and so on in a selected file are arranged in the first direction, on the display section 140 (step S201), as shown in FIGS. 6A and 7. In this process, the controller 110 displays the thumbnail bundle 50c including the static section 21, in which the thumbnail images 54, 60, 55, and 57 are juxtaposed at equal intervals, for example, with the thumbnail images 55 and 60 partially overlapping with each other, and the dynamic section 20, in which the thumbnail images are so disposed that the distance between adjacent images, for example, the distance between the thumbnail images 51 and 52 is greater than the distance between images in the static section 21, for example, the distance between the thumbnail images 55 and 60. The configuration of the thumbnail images 54, 60, 55, 57, and so on as images is the same as that in Display Method 1 and will therefore not be described.

The controller 110 then evaluates whether or not a thumbnail image has been selected, for example, by touching a touch point P2 in the static section 21 of the thumbnail bundle 50c (step S202). In the present example, a case where the thumbnail image 55 is selected as a second image is assumed. In a case where a thumbnail image has been selected (Yes in step S202), the controller 110 proceeds to the following step S203. In a case where no thumbnail image has been selected (No in step S202), the controller 110 keeps displaying the thumbnail bundle 50c.

In the case where a thumbnail image has been selected (Yes in step S202), the controller 110 evaluates whether or not a first image, which is an image moved in the second direction in advance, upward in the present example, is present in the static section 21 of the thumbnail bundle 50c (step S203). In a case where the thumbnail image 60 as the first image corresponds, for example, to a page selected in advanced by the user or a thumbnail image corresponding to a page having been read, and the position where the thumbnail image 60 is displayed is moved in the second direction in advance. In the present example, the thumbnail image 60 corresponds to the first image. The following description will be made by using the thumbnail image 60 as the first image. In a case where no thumbnail image 60 as the first image is present (No in step S203), the controller 110 moves the thumbnail image 55 selected in step S202 to a central portion of the dynamic section 20 in the thumbnail bundle 50c that is a central portion in the first direction (step S208), and the controller 110 terminates the series of processes.

In a case where the thumbnail image 60 as the first image is present (Yes in step S203), the controller 110 moves the thumbnail image 60 to a central portion of the dynamic section 20 in a thumbnail bundle 50d that is a central portion in the first direction (step S204) to form a thumbnail image 60d. In this process, the controller 110 moves the thumbnail image 55 along with the thumbnail image 60 shown in FIG. 6A into the dynamic section 20 and displays the moved thumbnail image 55 as a thumbnail image 55d shown in FIG. 6B.

The controller 110 then evaluates whether or not the user has made second selection, for example, whether or not the user has further touched the touch point P (step S205). In a case where the controller 110 determines that the user has made second selection (Yes in step S205), the controller 110 enlarges and displays a page corresponding to the thumbnail image 60d moved to a central portion of the dynamic section 20 that is a central portion in the first direction and a page corresponding to the thumbnail image before or after the thumbnail image 60d, a page corresponding to the thumbnail image before the thumbnail image 60d in the present example, as the main image 30 containing the first main image 31d and the second main image 32d in the second display region MP of the display section 140 (step S206), as shown in FIG. 6B. As described above, the currently displayed first and second main images are updated to the first main image 31d and the second main image 32d in response to the second selection, which is made after the thumbnail image 55 is selected, whereby the switching of the image state can be performed without causing the user to feel uneasiness.

The controller 110 then displays at the second selection timing the moved thumbnail image 60d and thumbnail image 55d in the form of images facing each other or images separate from each other by an increased distance (step S207), as shown in FIG. 6B. The controller 110 can also switch the displayed thumbnail image 60d and thumbnail image 55b to the thumbnail image 60d and thumbnail image 55b in the form of images facing each other or images separate from each other by an increased distance at the timing when the main image 30 is moved, that is, the timing when the first main image 31d and the second main image 32d are displayed. Updating the state of the images in the thumbnail bundle 50d at the timing described above allows the switching of the image state without causing the user to feel uneasiness.

After the steps described above, the procedure formed of the series of processes in Display Method 2 ends. The Display Method 2 described above not only allows the same effects as those provided by Display Method 1 described above to be provided but allows the thumbnail image 60 positionally moved in advance in the second direction out of the plurality of thumbnail images 51, 52, 53, 54, 55, 57, 60, and so on, which form the thumbnail bundle 50c shown in FIG. 6A, to be used as a mark corresponding, for example, to an image having been read, whereby the following image can be readily selected. Further, even when the thumbnail image 55 located in the static section 21 of the thumbnail bundle 50c is selected as the second image, the thumbnail image 60 in the vicinity of the selection position can be moved to a central portion of the dynamic section 20 that is a central portion in the first direction, and the thumbnail image 55 can be moved into the dynamic section 20. Therefore, not only can the contents of the thumbnail image 60 and 55 be readily recognized, but image selection can be readily made.

In a case where the user selects the thumbnail image 60 as the first image that is an image positionally moved in advance in the second direction, upward in the present example, in the static section 21 of the thumbnail bundle 50c shown in FIG. 6A, the controller 110 may cause the thumbnail image 60 to return to the original position and display, for example, the second main image 32d as the main image corresponding to the thumbnail image 60 in the second display region MP of the display section 140, as shown in FIG. 6B. The thumbnail image 60 as the first image positionally moved in advance in the second direction therefore allows correct image selection, whereby the second main image 32d corresponding to the thumbnail image 60 can be displayed in the second display region MP. In addition to this, since the thumbnail image 60 returns to the original position, the position of the thumbnail image can be reliably updated.

In a case where the user selects the main image 30, the controller 110 may cause the thumbnail image 60 as the first image that is an image positionally moved in advance in the second direction, upward in the present example, in the static section 21 of the thumbnail bundle 50c shown in FIG. 6A to return to the original position. That is, the thumbnail image 60 returns to the position where the thumbnail image 60 is juxtaposed with other thumbnail images in the thumbnail bundle 50d at the timing when the user selects one of the first main image 31d and the second main image 32d contained in the main image 30. The position of a positionally moved thumbnail image can thus be reliably updated.

The example shown in FIG. 6A has been described by presenting one thumbnail image 60 as an example of a thumbnail image displayed in a position moved in advance in the second direction. The number of thumbnail images displayed in positions moved in advance in the second direction is not limited to one and may be plural.

2.3. Display Method 3

Figure 8:
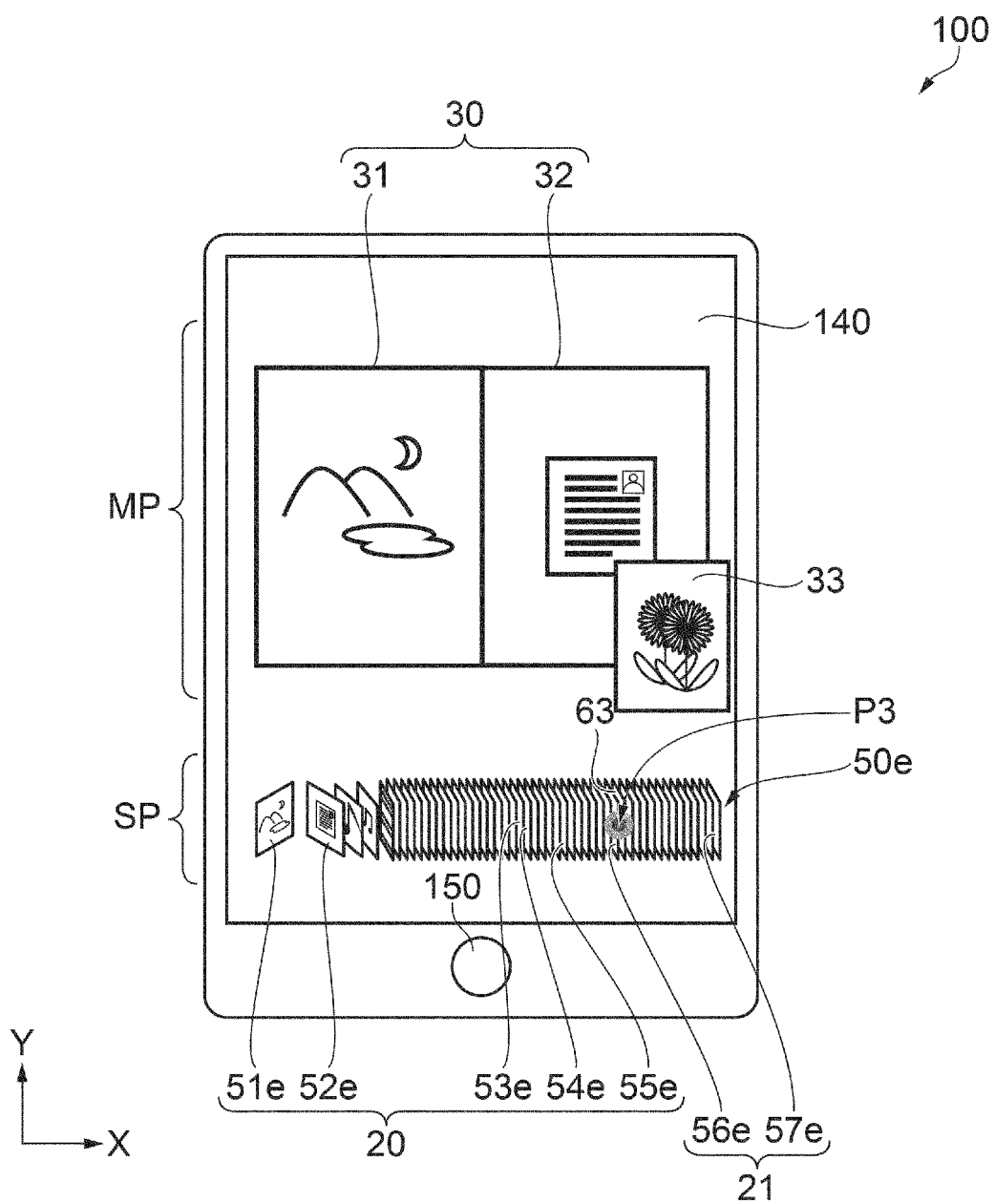
FIG. 8 shows Display Example 3, in which a main page and a thumbnail bundle containing thumbnail images are displayed.

Display Example 3 relating to Display Method 3 in the display apparatus 100 will next be described with reference to FIG. 8. FIG. 8 shows Display Example 3, in which a main page and a thumbnail bundle containing thumbnail images are displayed. The description of Display Example 3 will be made with the constituent portions of the display apparatus 100 labeled with the same reference characters described above.

In Display Example 3 in the display apparatus 100, not only the main image 30 containing the first main image 31 and the second main image 32 displayed in the second display region MP but a reference image 33, which corresponds to another thumbnail image to be referred to, are displayed in the second display region MP, as shown in FIG. 8. In the present example, a thumbnail image 63 is selected from thumbnail images 51e, 52e, 53e, 54e, 55e, 56e, 57e, and so on, which form a thumbnail bundle 50e, for example, by touching a touch point P3 on the display section 140, as in Display Examples described above. The reference image 33 corresponding to the selected thumbnail image 63 is then displayed in a free space of the second display region MP. The area of the displayed reference image 33 in the present example is smaller than that of the first main image 31 or the second main image 32, but the area of a displayed reference image is not limited to a specific value, and a necessary area of a displayed reference image can be employed.

Displaying the main image 30 and the reference image 33 in the second display region MP as in Display Example 3 allows the contents of the images to be more correctly read and understood.

2.4. Display Method

Figure 9:
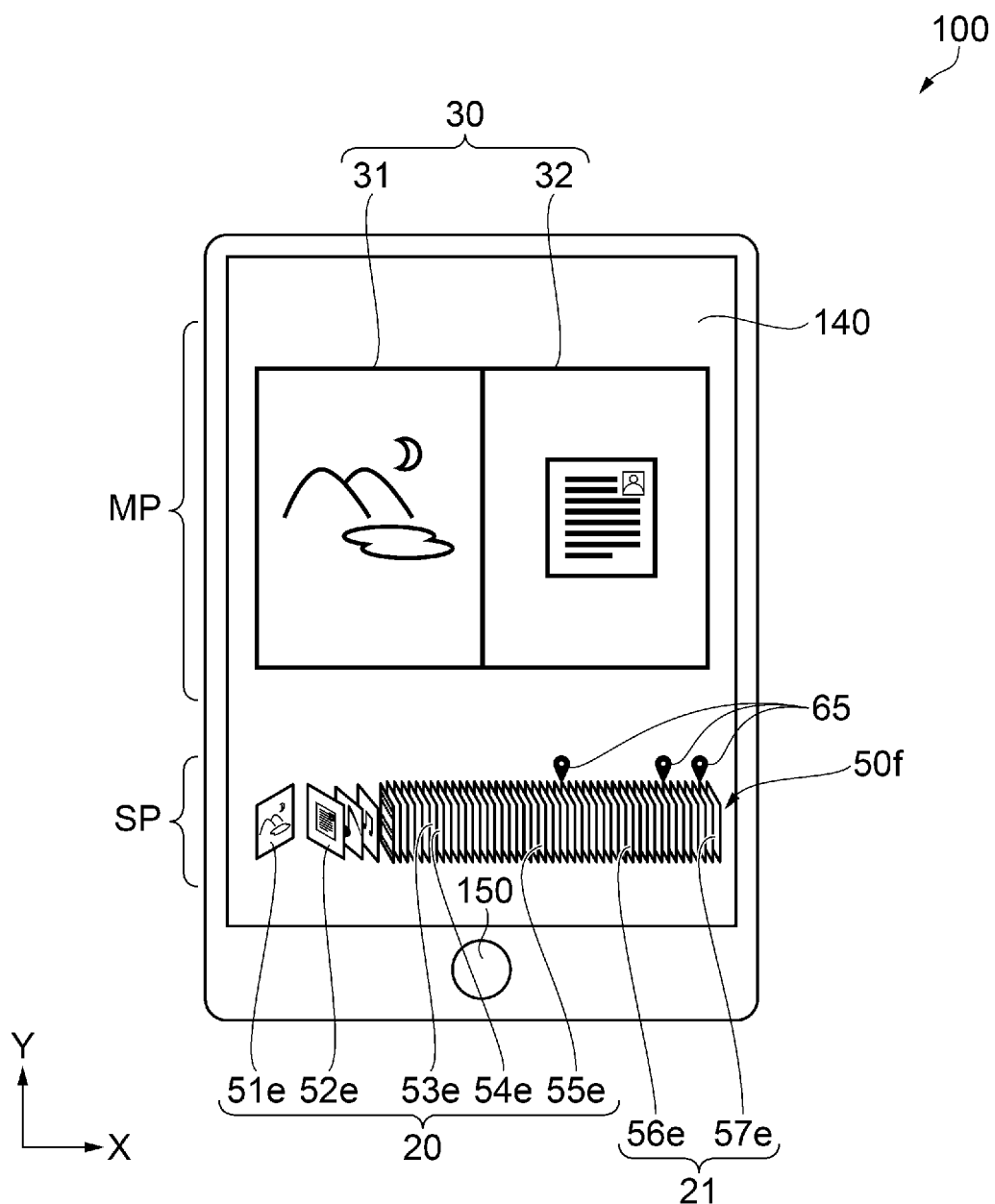
FIG. 9 shows Display Example 4, in which a main page and a thumbnail bundle containing thumbnail images are displayed.

Display Example 4 relating to Display Method 4 in the display apparatus 100 will next be described with reference to FIG. 9. FIG. 9 shows Display Example 4, in which a main page and a thumbnail bundle containing thumbnail images are displayed. The description of Display Example 4 will also be made with the constituent portions of the display apparatus 100 labeled with the same reference characters described above.

In Display Example 4 in the display apparatus 100, identification marks 65 are displayed at thumbnail images of a page having been read, a reference page, or any other page in the static section 21 of the thumbnail bundle 50e, as shown in FIG. 9. In other words, the identification marks 65 are attached to thumbnail images selected from the thumbnail images 56e, 57e, and so on that form a thumbnail bundle 50f and correspond to images that the user has determined as images that should be referred to. The thumbnail images to which the identification marks 65 are attached are each used in place of the thumbnail image 60 as the first image positionally moved in advance in the upward direction, which is the second direction, in Display Example 2 described above with reference to FIG. 6A.

In the static section 21 of the thumbnail bundle 50f, adding the identification marks 65 to thumbnail images each corresponding to the reference image and displaying the identification marks 65 allows more correct recognition of the positions of the images each corresponding to the reference image.

The above embodiment has been described with reference to a smartphone-type communication terminal apparatus as the display apparatus 100, but not necessarily. Examples of other display apparatuses may include a tablet terminal, a display of a personal computer, and the like. Further, the display apparatus can, for example, be a projector that uses a screen for video projection as the display section and projects an image containing an image bundle, such as a thumbnail bundle containing thumbnail images or other images, and other images on the screen.

Contents derived from the embodiment described above are described below as aspects of the present disclosure.

Aspect 1: A display method according to the present aspect is a display method for displaying a display image on a display section. The display section has a first display region and a second display region. An image bundle in which a plurality of images are juxtaposed in a first direction is displayed in the first display region, and a main image selected from the plurality of images is displayed in the second display region disposed with respect to the first display region in a second direction that intersects the first direction. The displayed image bundle includes a static section in which the images are juxtaposed at equal intervals with images adjacent to each other out of the juxtaposed images partially overlapping with each other and a dynamic section in which the images are so disposed that a distance between images adjacent to each other out of the juxtaposed images is greater than a distance between the images in the static section. When any of the images located in the static section is selected, the selected image is moved into the dynamic section.

In the display method according to the present aspect, when the user desires to particularly look at an image located in the static section of the image bundle, and when the user selects the image, the selected image is moved into the dynamic section, in which images are so disposed that the inter-image distance is greater than the inter-image distance in the static section. The range over which the selected image and images in the vicinity thereof are visually recognized is therefore increased, whereby the user can readily read and understand the images and can therefore readily perform selection search.

Since the main image selected from the plurality of images is displayed in the second display region, the user can readily recognize the content of the image bundle.

Aspect 2: In the display method described in the above aspect, the plurality of images may be so displayed as to be disposed along a first imaginary axis, rotated around respective second imaginary axes that intersect the first imaginary axis, and further rotated around the first imaginary axis.

According to the present aspect, in which an image bundle is so configured that a plurality of images disposed along the first imaginary axis, rotated around the respective second imaginary axes that intersect the first imaginary axis, and further rotated around the first imaginary axis are juxtaposed in the first direction, the content of the image bundle containing the plurality of images can be viewed in a bird's eye view.

Aspect 3: In the display method described in the above aspect, the image moved into the dynamic section may be displayed in a form of images facing each other.

According to the present aspect, the displayed two images in the form of images facing each other allow the displayed content of an image at which the user desires to particularly look to be more readable and understandable.

Aspect 4: In the display method described in the above aspect, the images located in the image bundle and corresponding to the main image displayed in the second display region may be displayed in a form of images facing each other.

According to the present aspect, the images located in the image bundle and corresponding to the main image displayed in the second display region are displayed in the form of images facing each other, which is a state different from the state of the other images, whereby the content of another image in the vicinity of the image corresponding to the main image in the image bundle can be readily recognized.

Aspect 5: In the display method described in the above aspect, a central portion of the dynamic section may move when the image is selected, and transition of the selected image to the main image and the images facing each other may be performed by second selection after the selection of the image.

According to the present aspect, the display state, such as the transition of the selected image to the main image and the images facing each other, is updated in response to the second selection after the selection of the image, switching of the image state can be performed without causing the user to feel uneasiness.

Aspect 6: In the display method described in the above aspect, the plurality of images contained in the image bundle may have a first image positionally moved in advance in the second direction, and when a second image is selected from the images located in the static section, the first image in the vicinity of the selection position may be moved to a central portion of the dynamic section that is a central portion in the first direction, and the second image may be moved into the dynamic section.

According to the present aspect, the first image positionally moved in advance in the second direction out of the plurality of images that form the image bundle can be used as a mark corresponding, for example, to an image having been read, whereby the following image can be readily selected. Further, when a second image located in the static section of the image bundle is selected, the first image in the vicinity of the selection position is moved to a central portion of the dynamic section that is a central portion in the first direction, and the second image is moved into the dynamic section, whereby not only can the contents of the first and second images be readily read and understood, but image selection can be readily made.

Aspect 7: In the display method described in the above aspect, the plurality of images contained in the image bundle may have a first image positionally moved in advance in the second direction, and when the first image is selected, the first image may return to an original position thereof, and the main image corresponding to the first image may be displayed in the second display region.

According to the present aspect, the first image positionally moved in advance in the second direction allows correct image selection, whereby the main image corresponding to the first image can be displayed in the second display region. In addition to this, since the first image returns to the original position thereof, the position of the first image can be reliably updated.

Aspect 8: In the display method described in the above aspect, the plurality of images contained in the image bundle may have a first image positionally moved in advance in the second direction, and when the main image is selected, the first image may return to an original position thereof.

According to the present aspect, since the first image returns to the original position thereof at the timing when the main image is selected, the position of the first image can be reliably updated.

Aspect 9: In the display method described in the above aspect, in addition to the main image displayed in the second display region, another image to be referred to may be selected from the images in the image bundle and displayed as a reference image in the second display region.

According to the present aspect, displaying the main image and the reference image in the second display region allows the contents of the images to be more correctly read and understood.

Aspect 10: In the display method described in the above aspect, an identification mark may be displayed at any of the images contained in the image bundle and corresponding to the reference image.

According to the present aspect, the position of the image corresponding to the reference image in the image bundle can be more correctly recognized.

Aspect 11: A display apparatus according to the present aspect includes a display section that has a first display region and a second display region and displays a display image, a thumbnail image generator that generates a plurality of images disposed along a first imaginary axis, rotated around a second imaginary axis that intersects the first imaginary axis, further rotated around the first imaginary axis, and displayed on the display section, a display image generator that includes a static section in which the images are juxtaposed at equal intervals with adjacent images of the juxtaposed images partially overlapping with each other and a dynamic section in which the images are so disposed that a distance between adjacent images of the juxtaposed images is greater than a distance between the images in the static section and generates an image bundle in which the images are juxtaposed along a first direction, and a controller that displays the image bundle in the first display region, displays a main image selected from the plurality of images in the second display region disposed with respect to the first display region in a second direction that intersects the first direction, moves, when any of the images located in the static section is selected, the selected image into the dynamic section, and displays the selected image on the display section.

In the display apparatus according to the present aspect, when the user desires to particularly look at an image located in the static section of the image bundle displayed on the display section, and when the user selects the image, the image selected by the controller is moved into the dynamic section, in which images are so disposed that the inter-image distance is greater than the inter-image distance in the static section. The movement increases the range over which the selected image and images in the vicinity thereof are visually recognized, whereby the user can readily read and understand the images and can therefore readily perform selection search.

Since the main image selected from the plurality of images is displayed in the second display region of the display section, the user can readily recognize the content of the image bundle.

What is claimed is:
1. A display method for displaying a display image on a display section,
wherein the display section has a first display region and a second display region,
an image bundle in which a plurality of images are juxtaposed in a first direction is displayed in the first display region,
a main image selected from the plurality of images is displayed in the second display region disposed with respect to the first display region in a second direction that intersects the first direction,
the displayed image bundle includes
a static section in which the images are juxtaposed at equal intervals with images adjacent to each other out of the juxtaposed images partially overlapping with each other, and
a dynamic section in which the images are so disposed that a distance between images adjacent to each other out of the juxtaposed images is greater than a distance between the images in the static section, and
when it is determined that any of the images located in the static section is selected, the selected image is moved into the dynamic section
wherein the image moved into the dynamic section and an image adjacent to the image moved into the dynamic section are displayed to face each other,
a central portion of the dynamic section moves when the image is selected, and
transition of the selected image to the main image and the images facing each other is performed by second selection after the selection of the image.
2. The display method according to claim 1,
wherein the plurality of images are so displayed as to be disposed along a first imaginary axis, rotated around respective second imaginary axes that intersect the first imaginary axis, and further rotated around the first imaginary axis.

3. The display method according to claim 1,
wherein the images located in the image bundle and corresponding to the main image displayed in the second display region are displayed in a form of images facing each other.

4. A display method for displaying a display image on a display section,
wherein the display section has a first display region and a second display region,
an image bundle in which a plurality of images are juxtaposed in a first direction is displayed in the first display region,
a main image selected from the plurality of images is displayed in the second display region disposed with respect to the first display region in a second direction that intersects the first direction,
the displayed image bundle includes
a static section in which the images are juxtaposed at equal intervals with images adjacent to each other out of the juxtaposed images partially overlapping with each other, and
a dynamic section in which the images are so disposed that a distance between images adjacent to each other out of the juxtaposed images is greater than a distance between the images in the static section,
when it is determined that any of the images located in the static section is selected, the selected image is moved into the dynamic section,
wherein the plurality of images contained in the image bundle has a first image positionally moved in advance in the second direction, and
when a second image is selected from the images located in the static section, the first image in the vicinity of the selection position is moved to a central portion of the dynamic section that is a central portion in the first direction, and the second image is moved into the dynamic section.

5. A display method for displaying a display image on a display section,
wherein the display section has a first display region and a second display region,
an image bundle in which a plurality of images are juxtaposed in a first direction is displayed in the first display region,
a main image selected from the plurality of images is displayed in the second display region disposed with respect to the first display region in a second direction that intersects the first direction,
the displayed image bundle includes
a static section in which the images are juxtaposed at equal intervals with images adjacent to each other out of the juxtaposed images partially overlapping with each other, and
a dynamic section in which the images are so disposed that a distance between images adjacent to each other out of the juxtaposed images is greater than a distance between the images in the static section, and
when it is determined that any of the images located in the static section is selected, the selected image is moved into the dynamic section,
wherein the plurality of images contained in the image bundle has a first image positionally moved in advance in the second direction, and
when the first image is selected, the first image returns to an original position thereof, and the main image corresponding to the first image is displayed in the second display region.

6. A display method for displaying a display image on a display section,
wherein the display section has a first display region and a second display region,
an image bundle in which a plurality of images are juxtaposed in a first direction is displayed in the first display region,
a main image selected from the plurality of images is displayed in the second display region disposed with respect to the first display region in a second direction that intersects the first direction,
the displayed image bundle includes
a static section in which the images are juxtaposed at equal intervals with images adjacent to each other out of the juxtaposed images partially overlapping with each other, and
a dynamic section in which the images are so disposed that a distance between images adjacent to each other out of the juxtaposed images is greater than a distance between the images in the static section, and
when it is determined that any of the images located in the static section is selected, the selected image is moved into the dynamic section,
wherein the plurality of images contained in the image bundle has a first image positionally moved in advance in the second direction, and
when the main image is selected, the first image returns to an original position thereof.

7. A display method for displaying a display image on a display section,
wherein the display section has a first display region and a second display region,
an image bundle in which a plurality of images are juxtaposed in a first direction is displayed in the first display region,
a main image selected from the plurality of images is displayed in the second display region disposed with respect to the first display region in a second direction that intersects the first direction,
the displayed image bundle includes
a static section in which the images are juxtaposed at equal intervals with images adjacent to each other out of the juxtaposed images partially overlapping with each other, and
a dynamic section in which the images are so disposed that a distance between images adjacent to each other out of the juxtaposed images is greater than a distance between the images in the static section, and
when it is determined that any of the images located in the static section is selected, the selected image is moved into the dynamic section,
wherein in addition to the main image displayed in the second display region, another image to be referred to is selected from the images in the image bundle and displayed as a reference image in the second display region.

8. The display method according to claim 7,
wherein an identification mark is displayed at any of the images contained in the image bundle and corresponding to the reference image.

9. A display apparatus comprising:
a display section that has a first display region and a second display region and displays a display image;

a thumbnail image generator that generates a plurality of images disposed along a first imaginary axis, rotated around a second imaginary axis that intersects the first imaginary axis, further rotated around the first imaginary axis, and displayed on the display section;

a display image generator that generates an image bundle that includes a static section in which the images are juxtaposed at equal intervals with adjacent images of the juxtaposed images partially overlapping with each other and a dynamic section in which the images are so disposed that a distance between adjacent images of the juxtaposed images is greater than a distance between the images in the static section and generates the image bundle in which the images are juxtaposed along a first direction; and a controller that displays the image bundle in the first display region, displays a main image selected from the plurality of images in the second display region disposed with respect to the first display region in a second direction that intersects the first direction, moves, when it is determined that any of the images located in the static section is selected, the selected image into the dynamic section, and displays the selected image on the display section;

wherein the image moved into the dynamic section and an image adjacent to the image moved into the dynamic section are displayed to face each other, a central portion of the dynamic section moves when the image is selected, and transition of the selected image to the main image and the images facing each other is performed by second selection after the selection of the image.

\* \* \* \* \*